(12) United States Patent
Chudley et al.

(10) Patent No.: US 11,072,904 B2
(45) Date of Patent: Jul. 27, 2021

(54) LIGHTWEIGHT VAULT COVER

(71) Applicant: Hubbell Incorporated, Shelton, CT (US)

(72) Inventors: Keith Alden Chudley, Knoxville, TN (US); Lemuel David Fagan, Lenoir City, TN (US); Jason David Estes, Knoxville, TN (US); Jeffrey Douglas Angelo, Sweetwater, TN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/290,486

(22) Filed: Mar. 1, 2019

(65) Prior Publication Data

US 2019/0271134 A1    Sep. 5, 2019

Related U.S. Application Data

(60) Provisional application No. 62/637,253, filed on Mar. 1, 2018.

(51) Int. Cl.
*E02D 29/14* (2006.01)
*B65D 90/10* (2006.01)
(Continued)

(52) U.S. Cl.
CPC .............. *E02D 29/14* (2013.01); *B29B 15/14* (2013.01); *B29C 70/025* (2013.01); *B65D 88/76* (2013.01);
(Continued)

(58) Field of Classification Search
CPC .......................... E02D 29/1472; E02D 29/14
See application file for complete search history.

(56) References Cited

U.S. PATENT DOCUMENTS 2,558,580 A  *  6/1951  Pomykala .................. E04H 7/20
                                                        52/20
3,450,593 A  *  6/1969  Fossier .................... E04C 2/365
                                                        428/73

(Continued)

FOREIGN PATENT DOCUMENTS

CN        2372371        4/2000

OTHER PUBLICATIONS

Scott Bader Crystic 491PA data sheet (Year: 2013).*
(Continued)

*Primary Examiner* — Thomas B Will
*Assistant Examiner* — Katherine J Chu
(74) *Attorney, Agent, or Firm* — Wissing Miller LLP (57) ABSTRACT

A cover for a utility vault and a method for making such covers. The cover is formed from fiberglass reinforcement layers and a polymer mix matrix. The reinforcement layers include a bottom reinforcement layer, one or more edge reinforcement layers, and a top reinforcement layer. A first portion of the edge reinforcement layer overlaps a portion of the bottom reinforcement layer and a second portion of the edge reinforcement layer overlaps a portion of the top reinforcement layer. The reinforcement layers are formed from fiberglass fabric and may include fiberglass layers whose fibers are oriented quadraxially. The polymer mix impregnates the fabric layers and forms the bulk of the cover. The polymer matrix bonds the reinforcement layers so that forces applied across the top and bottom layers are communicated to the edge reinforcement layer. The polymer matrix includes a thermoset polymer resin and an expanded glass bead filler.

9 Claims, 8 Drawing Sheets

(51) Int. Cl.
*B65D 88/76* (2006.01)
*E02D 29/055* (2006.01)
*B29C 70/02* (2006.01)
*B29B 15/14* (2006.01)
*B32B 5/02* (2006.01)
*C08J 5/04* (2006.01)
*C04B 111/00* (2006.01)

(52) U.S. Cl.
CPC ......... *B65D 90/105* (2013.01); *E02D 29/055* (2013.01); *B32B 5/02* (2013.01); *C04B 2111/00482* (2013.01); *C08J 5/043* (2013.01)

(56) References Cited

U.S. PATENT DOCUMENTS

| | | | | |
|---|---|---|---|---|
| 3,597,292 | A * | 8/1971 | Takeda | B29C 66/71 156/203 |
| 3,974,599 | A * | 8/1976 | Grosh | E02D 29/12 52/20 |
| 4,726,707 | A * | 2/1988 | Newton | E02D 29/14 264/258 |
| 6,656,405 | B1 * | 12/2003 | Debergh | B29C 70/20 264/258 |
| 7,361,834 | B1 * | 4/2008 | Trangsrud | H02G 3/14 174/66 |
| 7,484,909 | B2 * | 2/2009 | Brady | E02D 29/124 404/25 |
| 7,914,227 | B2 * | 3/2011 | Jordan | E02D 29/14 404/25 |
| 8,727,659 | B1 * | 5/2014 | Reynolds | E02D 29/14 404/25 |
| 8,979,421 | B2 * | 3/2015 | Jang | E02D 29/14 404/25 |
| 9,676,118 | B2 * | 6/2017 | Mathieu | B28B 1/525 |
| 10,011,967 | B2 * | 7/2018 | Kriegstein | E04H 12/2292 |
| 10,280,587 | B2 * | 5/2019 | Nachyla | E02D 29/1481 |
| 2009/0072978 | A1 * | 3/2009 | Tilson, Jr. | B28B 23/00 340/572.9 |
| 2010/0062238 | A1 * | 3/2010 | Doyle | B29C 70/02 428/295.1 |
| 2010/0264274 | A1 | 10/2010 | Bradley | |
| 2010/0276542 | A1 | 11/2010 | Rouyre | |
| 2015/0079356 | A1 * | 3/2015 | Mathieu | E04C 2/049 428/192 |
| 2015/0190972 | A1 * | 7/2015 | Ehsani | E04H 12/2292 156/71 |
| 2015/0210512 | A1 * | 7/2015 | Kawasaki | B66B 23/24 198/337 |
| 2016/0069039 | A1 | 3/2016 | Johnson et al. | |
| 2017/0189819 | A1 * | 7/2017 | Chen | A63G 9/00 |
| 2018/0163361 | A1 * | 6/2018 | Nunnery | E02D 29/1427 |
| 2019/0218743 | A1 * | 7/2019 | Balsells Mercade | E02D 17/10 |
| 2019/0254438 | A1 * | 8/2019 | Rose | A47C 20/041 |
| 2019/0257086 | A1 * | 8/2019 | Pfaff | E04C 5/07 |
| 2019/0323199 | A1 * | 10/2019 | Hensel | E02D 29/1472 |

OTHER PUBLICATIONS

Colan Australia. Quadraxial. Feb. 27, 2015. [online] Retrieved from the Internet <URL: 13-14 https://web.archive.org/web/20150227152752/http://www.colan.com.au/compositereinforcement/stitched/quadraxial.html>; first page.

Quazite. "ANSI Tier" Selection and Placement in Non-Deliberate Vehicular Traffic Applications . . . Feb. 2014. [online] Retrieved from the Internet <URL: http://comstarcity.com/ files/datasheets/QUAZITE-CATALOG-2014-HPS%20QZ-1 B.pdf>; p. 16.

International Search Report and Written Opinion dated PCT/US19/20353 dated Jun. 20, 2019.

International Preliminary Report on Patentability in PCT/US2019/020353 dated Sep. 1, 2020 (7 pages).

* cited by examiner

LIGHTWEIGHT VAULT COVER

This application claims priority under 35 U.S.C. § 119 to U.S. Provisional Patent Application No. 62/637,253, filed on Mar. 1, 2018. The disclosure of that application is incorporated herein by reference.

BACKGROUND

Field

The present disclosure relates to covers for utility vaults, trenches, and other in-ground openings and to methods for forming such covers. More particularly, the present disclosure relates to lightweight vault covers formed from a glass bead filled polymer concrete with fiberglass reinforcements and methods for forming such covers.

Description of the Related Art

Equipment for utilities, such as transformers, switches, control panels, and valves are often housed in vaults located underground. Such vaults include an opening at the top to allow workers to access the equipment, either by reaching down through the opening, or for larger vaults, allowing workers to descend into the vault. The opening must be covered to protect the equipment from weather and from unauthorized access. Vault covers are generally shaped to conform to a collar formed at the top of the vault surrounding the opening. The cover fits into the collar and may be secured to the top of the vault by bolts. The cover is supported at its edges by the collar.

The cover of many vaults lies at ground level to provide a continuous surface with the surrounding area. For example, a vault may be located below a pedestrian sidewalk. To avoid a tripping hazard, the vault cover needs to be substantially flush with the surrounding sidewalk. Likewise, the cover of a vault located below a roadway must be substantially co-planar with the road to allow vehicles to pass. Because the cover is flush with the ground, it may be subject to heavy loads, such as when a vehicle drives over the cover. To avoid damage, vault covers need to be strong enough to withstand the maximum load expected for a particular situation.

Known vault covers are typically made from moldable materials, such as concrete. The concrete forming known vault covers is a mixture of a cement and a mineral aggregate. The cement may be a thermoset polymer resin. The aggregate may be a combination of mineral materials with components of various sizes from sand to small gravel. Because concrete may have low tensile strength, known covers may include strengthening members, such as rebar, to withstand tensile loads.

Vault covers need to be removed from time to time to allow workers to access equipment in the vault. Typically, vault covers include a handle or lifting pin that can be grasped by the worker. A single worker may be able to lift a small cover without tools. For larger covers, such as those that allow a worker to bodily enter the vault, the weight of the cover may prevent the worker from lifting it himself. The worker may need to bring a tool, such as a cover lifter or heavy equipment such as a backhoe, to open the vault. This adds cost and complexity to the task of servicing equipment in the vault. If lighter materials are used to form the cover, such as by using thinner rebar, or using less of the aggregate, the strength of the cover may be reduced.

Thus, there is a need for a vault cover that provides high strength to resist loads, while at the same time having less weight than known covers to facilitate convenient access to the vault.

SUMMARY

The present disclosure relates to apparatuses and methods to address these difficulties.

According to one embodiment, there is a vault cover comprising a polymer mix matrix, a top reinforcement, a bottom reinforcement, and one or more edge reinforcements. The reinforcements comprise layers of fiberglass fabric. According to one embodiment, the fiberglass fabric is formed from fibers arranged quadraxially. The matrix comprises a thermoset polymer cement and an expanded glass bead filler. The matrix infiltrates and binds with the reinforcements. The edge reinforcement sheet overlaps the edges of the top reinforcement and the bottom reinforcement. When the thermoset polymer hardens it binds the edge reinforcement to the top and bottom reinforcements.

According to another embodiment, a method for forming a vault cover is provided comprising the steps of providing a mold cavity, placing a top reinforcement layer along a bottom surface of the mold cavity, placing an edge reinforcement along at least one edge of the mold cavity, wherein a first portion of the edge reinforcement overlaps a portion of the top reinforcement and second portion of the edge reinforcement extends out of the mold cavity, substantially filling a space within the edge reinforcement and above the top reinforcement with one or more components of a matrix material, placing a bottom reinforcement layer on top of the at least one component of the matrix material, and folding the second portion of the edge reinforcement over the bottom reinforcement layer. In one aspect the at least one component of the matrix material is a filler and the method further comprises the step of introducing a second component of the matrix material into the mold cavity, wherein the second component is a polymer resin that infiltrates the interstitial spaces of the filler material and the top, edge, and bottom reinforcements. The step of introducing may be performed using injection molding, such as by placing a top lid over the mold cavity, applying a negative pressing to the cavity through an outlet port, and injecting the resin into the cavity via an inlet port. The resin may comprise one or more of an unsaturated polyester resin, a methacrylate, a vinyl ester, and an epoxy.

According to another aspect the one or more components of the matrix material comprise a mixture of a polymer cement and a filler, and the step of substantially filling comprises infiltrating the mixture into the top and edge reinforcements with a first portion of the mixture and, following the step of folding, the method further comprises pouring a second portion of the mixture into the mold cavity and infiltrating the mixture into the bottom reinforcement.

One or more of the top reinforcement layer, the bottom reinforcement layer, and the edge reinforcement layer may be formed by a fiberglass fabric. The fabric may comprise a quadraxial fabric. The one or more components of the matrix material may comprise one or more of glass beads, expanded glass beads, limestone aggregate, silica sand, chopped fiberglass fibers, polymer fibers, metallic fibers, fly ash, expanded ceramic spheres and ceramic particles.

The method may include forming features on one or more surfaces of the mold cavity, wherein the features form one of more of a slot, a bolt hole, a textured surface, and an indicia. According to one aspect of the method an edge of the vault cover formed by the disclosed method has a curvilinear shape and the method further comprises the steps of notching the edge reinforcement and fitting the notched edge reinforcement into the mold cavity to conform to the curvilinear shape.

According to another embodiment of the disclosure, there is provided a vault cover comprising a bottom reinforcement layer, at least one edge reinforcement layer, a top reinforcement layer, and a matrix, wherein a first portion of the edge reinforcement layer overlaps a portion of the top reinforcement layer, and a second portion of the edge reinforcement layer overlaps a portion of the bottom reinforcement layer and wherein the overlapping portions are bonded with one another by the matrix.

One or more of the top reinforcement layer, the bottom reinforcement layer and the edge reinforcement layer may be formed by a fiberglass fabric. The fiberglass fabric may be a quadraxial fabric. The matrix may comprise a filler and one or more of an unsaturated polyester resin, a methacrylate, a vinyl ester, and an epoxy. The filler may comprise one or more of glass beads, expanded glass beads, limestone aggregate, silica sand, chopped fiberglass fibers, polymer fibers, metallic fibers, fly ash, expanded ceramic spheres and ceramic particles According to one aspect, the vault cover is adapted to cover a utility vault, a trench, or an opening in a road surface. The vault cover may include lifting pins, fastener holes, a textured surface, and indicia. One or more of a RFID device, an electronic sensor, and an induction coil may be embedded in the matrix of the vault cover. According to one aspect, when tested according to ANSI SCTE 77 Tier 22, the load at failure of the vault cover is greater than 33,000 pounds.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6b is a plane view of an edge reinforcement used to form the cover of FIG. 6a.

DETAILED DESCRIPTION

Figure 1:
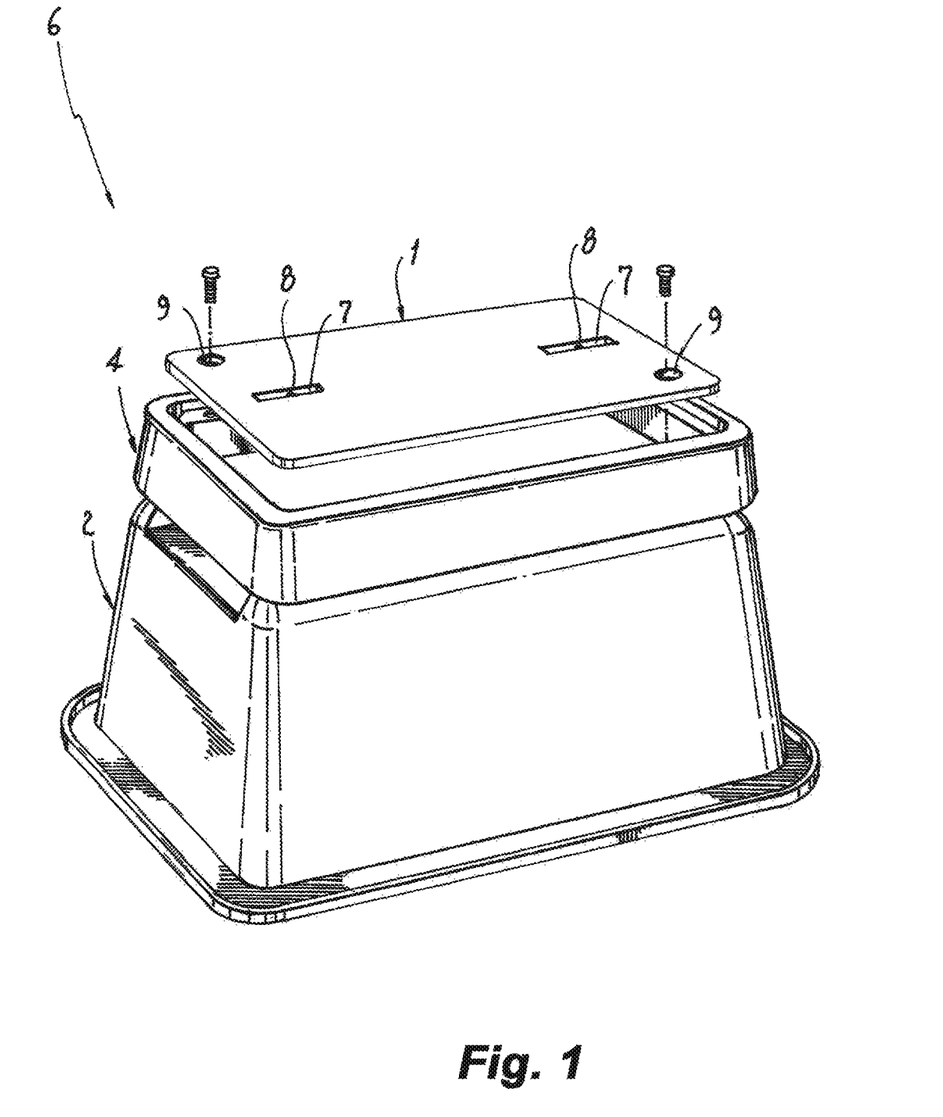
FIG. 1 is a perspective view of a vault including a cover according to an embodiment of the disclosure.

FIG. 1 shows an underground utility vault 6. The vault 6 includes a vault chamber 2, a collar 4, and a cover 1. The chamber 2 is sized to hold equipment, such as electrical connections, switches, transformers, valves, meters, and the like. Collar 4 is positioned at the top of the chamber 2. Cover 1 fits within collar 4 and rests against a shoulder along the inner edge of collar 4. Vault 6 is designed to be installed below ground, for example, beneath a roadway, a sidewalk, or a lawn with the cover 1 flush with the ground surface. Cover 1 may include one or more lifting pins 8 located within slots 7. Bolts may be provided in bolt holes 9 to secure cover 1 onto collar 4. Bolts may have a security feature such as a head requiring a specialized tool, for example, a pentagonal shape, to discourage unauthorized persons from tampering with the vault or its contents. Cover 1 may have a textured top surface to increase friction and reduce the chance that a person may slip when walking across the cover. Cover 1 may also include indicia, for example, "TRAFFIC SIGNAL" or "WATER VALVE" to indicate the type of contents within the vault 6.

According to another embodiment, instead of covering a vault, cover 1 forms a trench cover for removably covering a trench, such as a trench for holding below ground utility services. According to this embodiment, the width of cover 1 is such that it spans the width of the trench. Such a cover may be elongated to extend along the whole length of the trench or multiple covers covering portions of the trench may be used depending on the length of the trench. According to one aspect, cover 1 rests on shoulders formed along the top edges of the trench so that the top surface of the cover is flush with the surrounding ground surface.

According to another embodiment, cover 1 forms a road plate for covering a hole in a road bed, for example, while repair work is done on structures beneath the surface of a road. According to one aspect, the road plate is provided with beveled edges so that, when it is positioned on the surface of a road, vehicles can easily roll onto and off of the road plate.

Figure 2A:
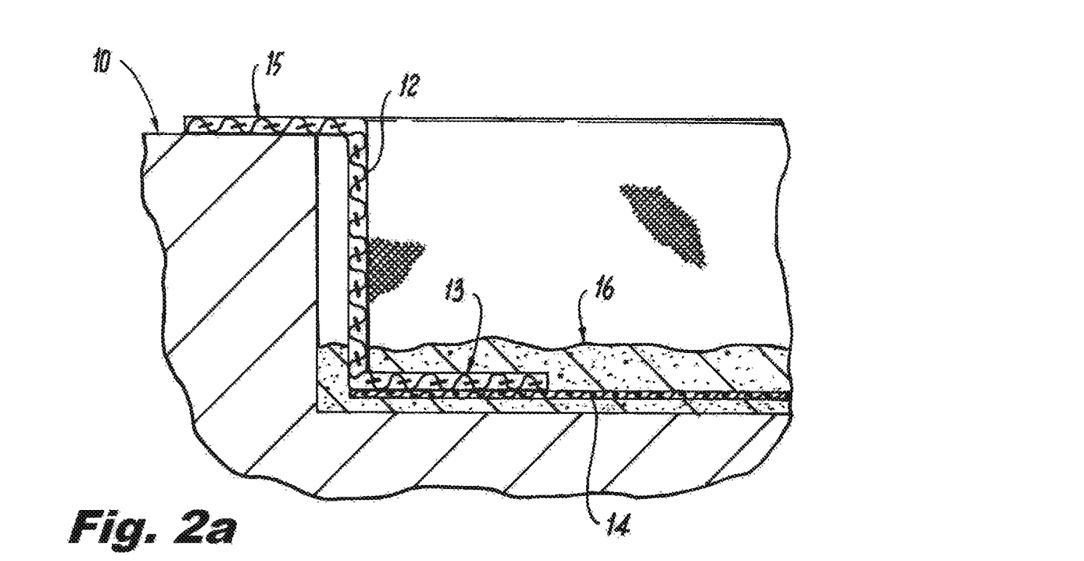
FIGS. 2a-d are cross sections of a mold cavity showing steps for forming a cover according to an embodiment of the disclosure.

FIGS. 2a-2d are cross sectional views of a portion of a mold 10 illustrating steps to form cover 1. A variety of cover shapes and sizes can be formed by varying the size and shape of the cavity of mold 10. As shown in FIG. 2a, a first portion 16 of a polymer mix is poured into the mold cavity. A top reinforcement 14 is placed into the mold and is wetted by the polymer mix. According to one alternative embodiment, the top reinforcement is placed into the mold first and the polymer mix is poured over the reinforcement. The top reinforcement may be a fiberglass fabric, such as 18 oz. woven roving. Top reinforcement extends parallel to the bottom surface of the mold cavity and covers substantially the whole of the bottom surface of the mold cavity.

According to one embodiment, features of cover 1 such as slots 7, bolt holes 9, indicia, and/or texturing on the finished part are formed by the shape and texture of the bottom surface of the cavity of mold 10. Where the shape of the bottom surface of the mold cavity extends substantially upward from the bottom of the mold, for example, to form slots 7 and bolt holes 9, top reinforcement 14 is cut to fit around these features. In addition, structures to be embedded in the vault cover 1, such as lifting pins 8, may be placed in the mold 10 prior to pouring in polymer mix 16.

Edge reinforcement 12 is placed into the cavity 10 as shown in FIG. 2a. A portion 13 of the edge reinforcement 12 overlaps the top reinforcement 14. Another portion 15 of the edge reinforcement 12 extends out of the mold cavity and rests on the side of the mold. The polymer mix 16 wets overlapping portion 13. When the polymer mix solidifies, it will create a bond between overlapping portion 13 and top reinforcement 14.

According to alternative embodiment, edge reinforcement 12 is placed in the mold first, with a first portion 13 lying on the bottom surface of the mold cavity and a second portion 15 extending out of the cavity 10. Top reinforcement 14 is then laid into the bottom of the mold cavity with the edges of the top reinforcement layer lying on top of the first portion 13 of the edge reinforcement. The first portion 16 of the polymer mix is then poured into the mold cavity. This embodiment differs from what is shown in FIG. 2a in that the top reinforcement 14 overlies the first portion 13 of the edge reinforcement 12.

According to one embodiment, edge reinforcement 12 is a fiberglass fabric, such as a woven roving or a biaxial or triaxial fiberglass fabric. According to a preferred embodiment, reinforcement 12 is a quadraxial fiberglass fabric with fibers aligned in separate layers offset from one another by 0°, 90°, −45°, +45°. The layers may be stitched to one another using, for example, polyester stitching at 1 inch intervals. According to a preferred embodiment, the fiberglass fabric is a 48 oz. per square yard quadraxial fiberglass fabric manufactured by Flotex™ and sold under part number E-LHXF-4800. Fabrics made by other manufacturers can be used and other weights of quadraxial fabrics can also be used including 36 oz. per square yard fabric. Such fabrics have an open structure, allowing liquids, such as the polymer mix, to readily infiltrate between the fiberglass fibers and wet the fibers. According to one embodiment, the surface of the fibers is chemically or mechanically treated to be readily wetted by the polymer mix and to securely bond with the polymer mix once the polymer mix hardens.

Figure 2B:
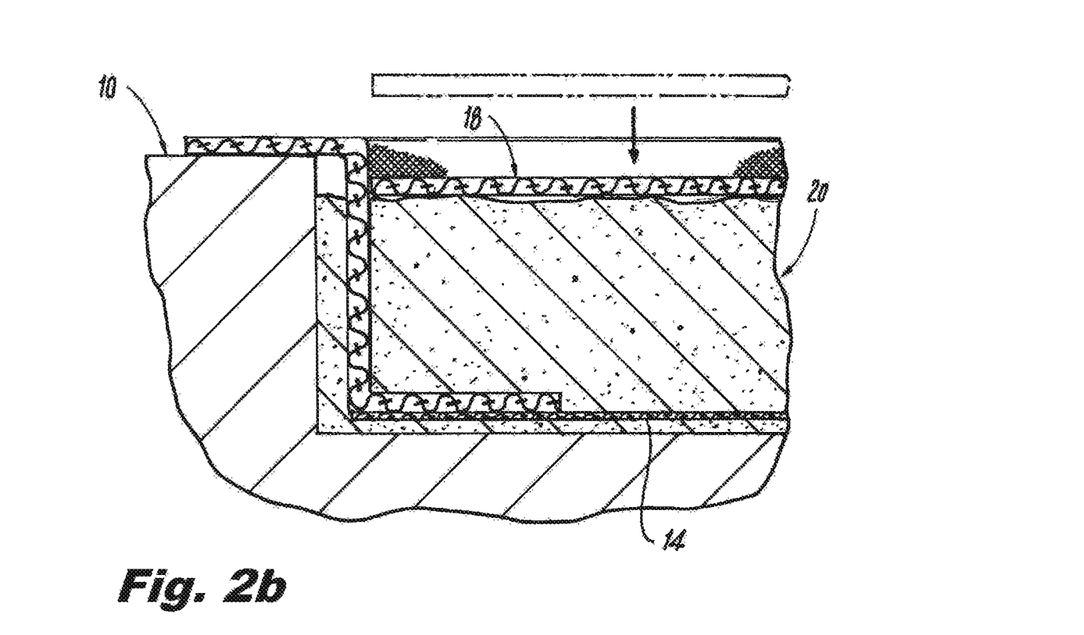

As shown in FIG. 2b, a second portion 20 of polymer mix is poured into the cavity of mold 10. A bottom reinforcement 18 is placed into the mold cavity on top of the second portion of 20 of the polymer mix. Bottom reinforcement may be a fiberglass fabric. According to a preferred embodiment, bottom reinforcement 18 and top reinforcement 14 are formed from the same quadraxial fiberglass fabric that forms the edge reinforcement 12.

Figure 2C:
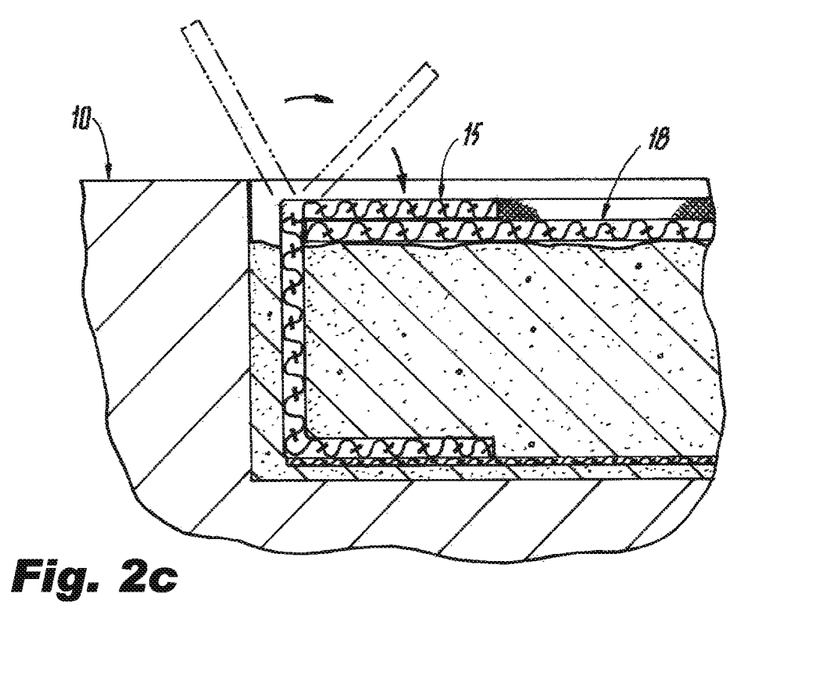

As shown in FIG. 2c, portion 15 of reinforcement 12 is folded over bottom reinforcement 18. In an alternative embodiment to what is shown in FIG. 2c, portions 15 are folded into the mold cavity before the bottom reinforcement 18 is placed into the cavity. This alternative embodiment differs from what is shown in FIG. 2c in that the bottom layer 18 overlies the second portions 15 of the edge reinforcement.

Figure 2D:
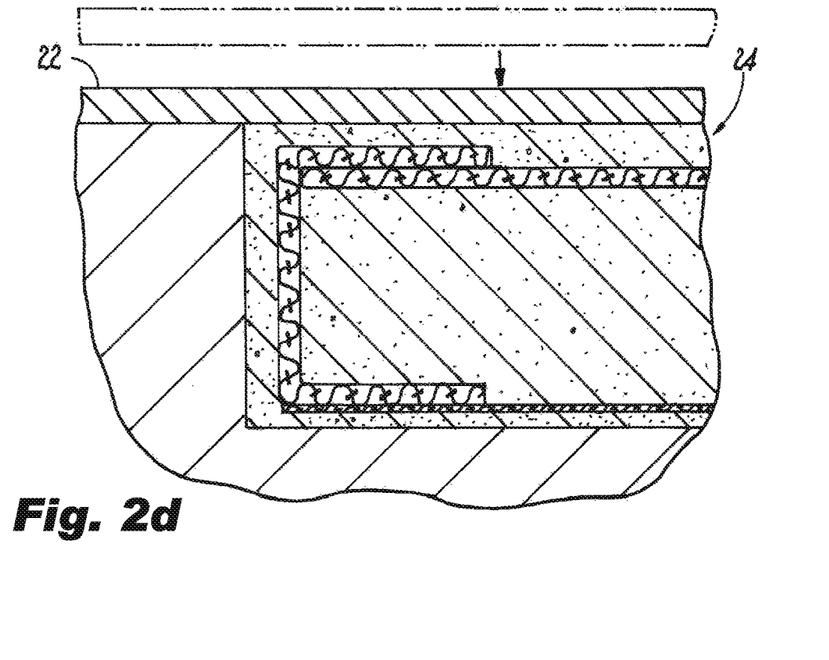

As shown in FIG. 2d, a third portion 24 of polymer mix is poured into the mold cavity 10 to wet portion 15 and reinforcement 18 and to fill the cavity. When the polymer mix hardens it will form a bond between bottom reinforcement 18 and edge reinforcement 12 and between the top reinforcement 14 and edge reinforcement 12. As shown in FIG. 2d, a top portion of mold 22 may be closed over the mold 10. Force may be applied to the top 22 by a mechanical, pneumatic, or hydraulic clamping mechanism or by placing weights on the top 22 to apply increased hydrostatic pressure to the polymer mix, driving the mix to infiltrate the fiberglass reinforcements 12, 14, 18 and helping to drive air bubbles out of the matrix. According to another embodiment, instead of closing mold 10, as shown in FIG. 2d, the mold is left open and the polymer mix is allowed to set with the surface of the mix exposed.

According to one embodiment, the polymer mix includes a thermoset polymer such as a polyester resin. The resin includes a hardener component that is mixed with the resin prior to pouring the mix into the mold cavity to initiate a chemical reaction to cause the mix to solidify. According to one embodiment, the resin is an unsaturated polyester resin sold as Polynt™ 768-6871 by Polynt SpA. This resin is a low-viscosity (100 cps) resin, promoted using cobalt octuate and dimethylaniline and cured using a methyl ethyl ketone peroxide (mekp). According to other embodiments the polymer resin is an unsaturated polyester promoted solely with anilines and cured using benzoyl peroxide (bpo). According to further embodiments, the resin is a methacrylate, a vinyl ester, or an epoxy. Such resins can be cured using the above-mentioned metal salt/peroxide and/or aniline/peroxide systems already mentioned, but also heat-activated and UV curing systems.

According to one embodiment, a filler is added to the polymer mix such as limestone aggregate, silica sand, chopped fiberglass fibers, polymer fibers, metallic fibers, fly ash, and/or combinations thereof. According to a preferred embodiment, the filler comprises glass beads instead of, or in addition to other fillers such as limestone aggregate. To reduce the weight of the finished cover 1, the glass beads may be expanded using techniques known to those of skill in the field of the invention. The glass beads may be formed from recycled materials. According to one embodiment, the filler is entirely expanded glass beads and comprises from 20% to 80% by weight of the polymer mix. According to a more preferred embodiment, the glass beads comprise between 40% and 70% by weight of the polymer mix. According to a most preferred embodiment, the glass beads comprise 55% by weight of the polymer mix. According to a preferred embodiment, the glass bead filler is manufactured by Dennert Poraver GmbH with a particle size from 0.04 mm to 8.0 mm and has an apparent density from 20 to 60 lb/cubic foot, depending on the particle size. According to a further embodiment, instead of expanded glass beads, the filler comprises other lightweight materials such as expanded ceramic spheres or particles. Using expended glass beads results in a reduction in weight to the cover 1 compared with covers made using mineral aggregates.

Figure 3:
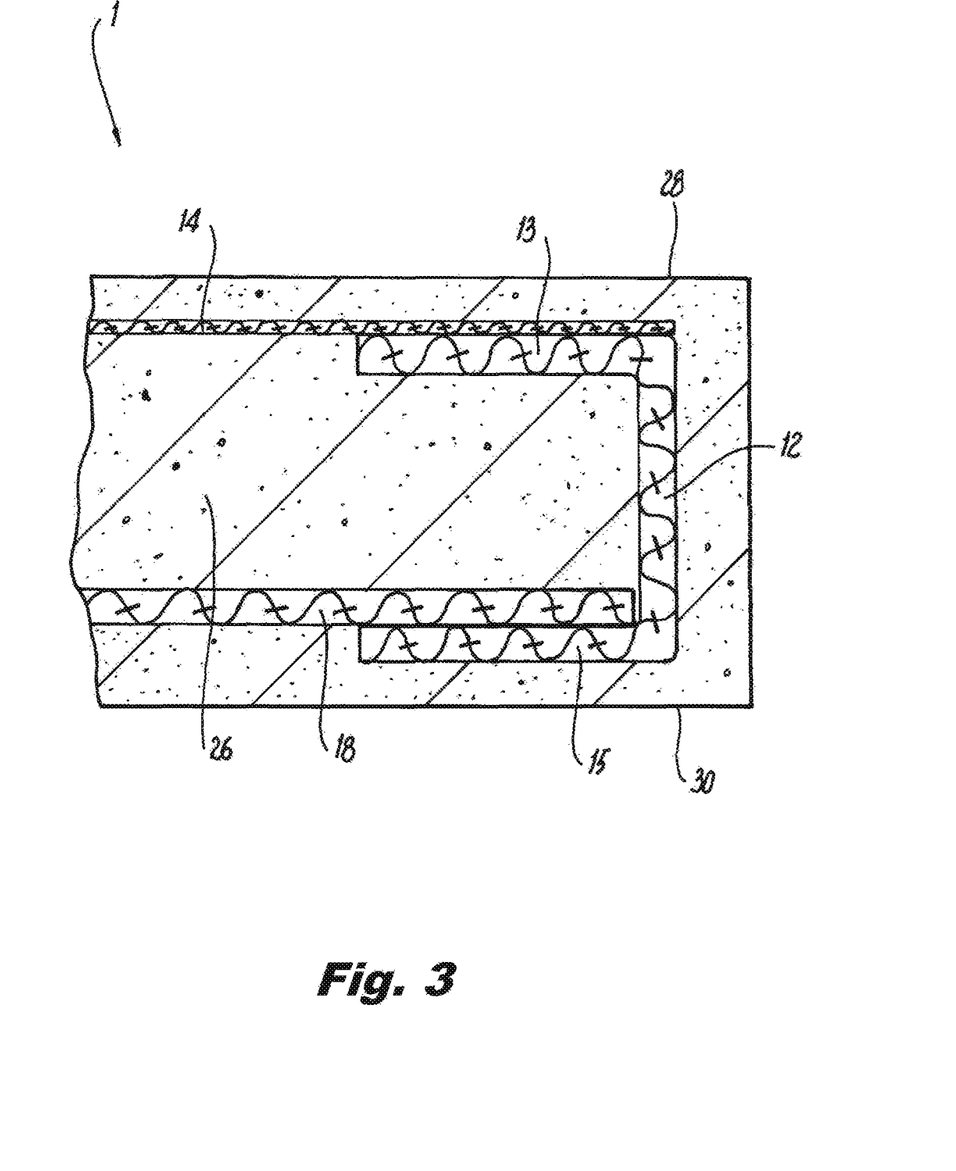
FIG. 3 shows a cross sectional view of a portion of a cover formed by the steps of FIGS. 2a-d.

FIG. 3 shows a detailed view of the edge of cover 1 after the polymer mix has hardened into a continuous concrete mass 26 and the cover has been removed from the mold and oriented upright. Top reinforcement 14 lies within the mass 26 below the top surface 28. The hardened polymer mix, which has infiltrated reinforcements 12, 14 and 18 bonds overlapping portions 13 and 15 of the edge reinforcement 12 with the top reinforcement 14 and bottom reinforcement 18, respectively.

Construction of a cover according to an embodiment of the disclosure results in a light weight structure with a significant increase in strength. As an example, in one investigation three covers with identical polymer mix material including a glass bead filler were produced with different reinforcement strategies. The baseline cover (Part #1) was made with a traditional fiberglass strategy of a "face glass" and a "back glass" with each glass being 18 oz biaxial construction. No edge reinforcing layer was provided. Part #2 was made using the 18 oz biaxial glass construction, but adding 18 oz glass "wrapped" around the part edges. Part #3 was made replacing the 18 oz "back glass" and "wrap glass" with quadraxial 36 oz glass arranged as shown in FIG. 3. Each part was destructively tested (per ANSI SCTE 77 Tier 22 requirements) with the following results:

TABLE 1

| | Load at Failure |
|---|---|
| Part #1 | 16,200 Lbs |
| Part #2 | 32,560 Lbs |
| Part #3 | 51,970 Lbs |

As shown in Table 1, adding a fiberglass reinforcement to the edge of the cover in Part #2 has the unexpected effect of significantly increasing strength compared with a cover formed without edge reinforcement, Part #1 while adding very little additional weight. In addition, by providing a quadraxial fiberglass fabric as an edge reinforcement, Part #3, strength is increased still further.

According to further embodiments of the disclosure structures are embedded in the polymer matrix during assembly of cover 1. For example, RFID circuitry can be provided in the cover to enable workers to identify the location and contents of a vault using an electronic sensor. Cover 1 may include circuitry that interfaces with a meter housed in the vault to allow workers to remotely monitor the quantity of electricity, water, or gas used by a utility customer. Induction coils for monitoring the location and speed of vehicles in the vicinity of a vault can be provided to facilitate operation of traffic control devices, e.g., stoplights.

Figure 4A:
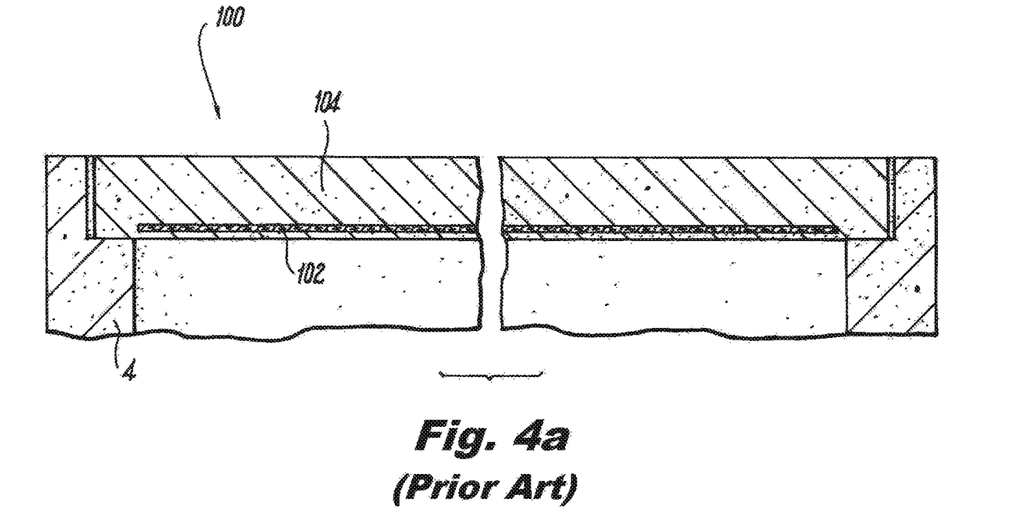
FIG. 4a is a cross section showing a prior art cover installed on a vault without a load applied.
Figure 4B:
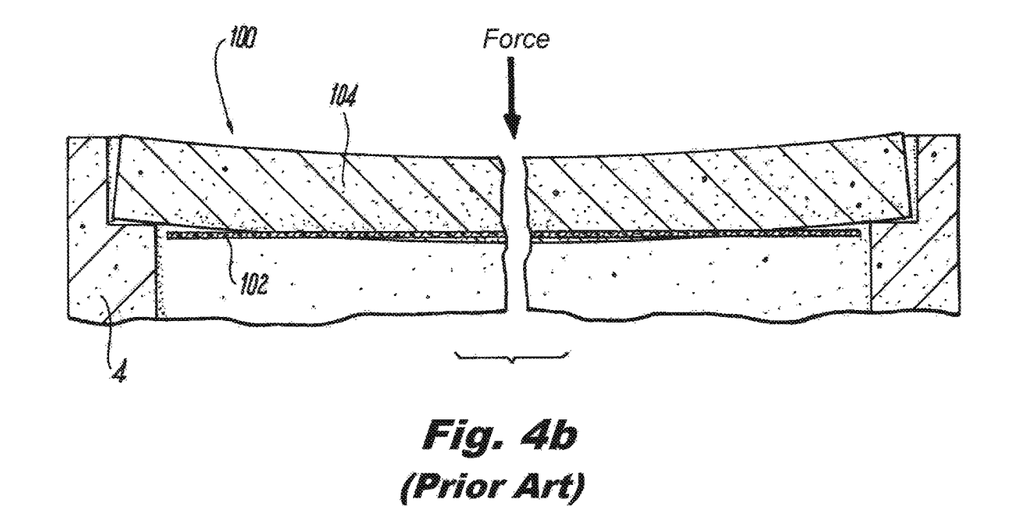
FIG. 4b shows the prior art cover of FIG. 4a with a load applied to its top surface.

FIGS. 4a and 4b illustrate a known vault cover 100. As shown in FIG. 4a, cover 100 includes a bottom reinforcement 102 embedded in a molded polymer matrix 104. The reinforcement 102 may be a fiberglass fabric infiltrated with the polymer matrix 104. Cover 100 may be installed within a collar 4 of a vault 6, such as the one shown in FIG. 1. FIG. 4b shows cover 100 with a force F applied to the top of the cover. Such a force may be the result of a vehicle or other heavy object on top of the cover. Because cover 100 is supported along its edges by collar 4, downward force will cause cover 100 to flex with the bottom surface in tension. Because reinforcement 102 impregnated with the solidified polymer is stiff, it tends to pull away from the bottom of the cover 100 and delaminate. As a result, the cover 100 loses strength and may collapse, potentially causing damage to the vault and any equipment resident in the vault.

Figure 5:
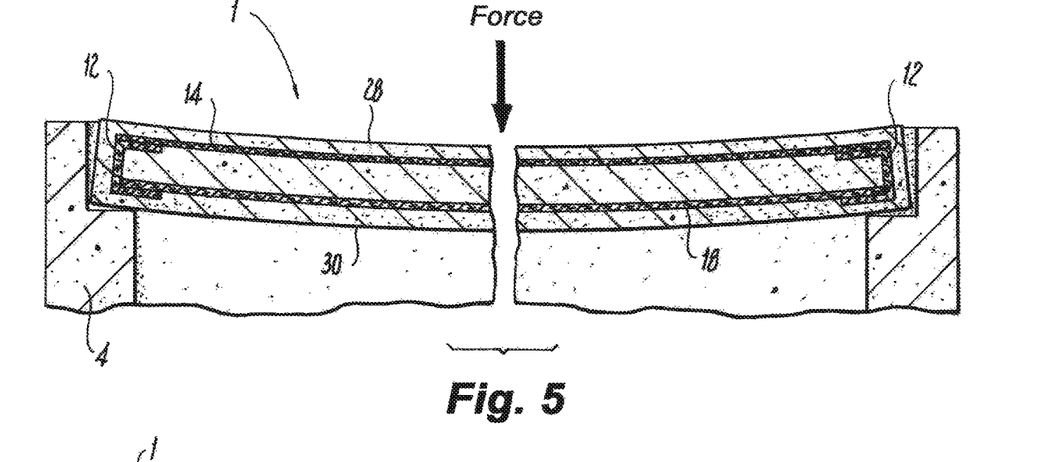
FIG. 5 is a cross section of a cover according to an embodiment of the disclosure installed on a vault with a load applied to its top surface.

FIG. 5 shows cover 1 according to the present disclosure installed within the collar 4 of a vault with downward force F applied. Here, because the edge reinforcements 12 are bonded with the bottom reinforcement 18 at each edge of the cover, the bottom reinforcement does not delaminate from the cover. Instead, tensile forces along the bottom surface 30 of the cover 1 are communicated to the edge reinforcements and then through the thickness of the cover to the top reinforcement 14. In addition, because the edge reinforcements 12 are formed from a quadraxial fabric with fibers aligned in different directions (i.e., at 0°, 90°, −45°, +45°), any tensile force applied to the edge reinforcements will be in a direction no more than 22.5° from the axis of fibers in at least one layer. Likewise, in embodiments where bottom reinforcement 18 is also formed from a quadraxial fiberglass fabric, tensile forces along the bottom surface 30 of the cover will likewise be substantially aligned (i.e., within 22.5°) with at least one layer of the fibers. This alignment allows tensile forces to be communicated from the bottom surface 30 to the edges and through the thickness of the cover 1. According to some embodiments, this arrangement of reinforcements allows covers made from lightweight concrete to have sufficient strength without embedded rebars.

Figure 6A:
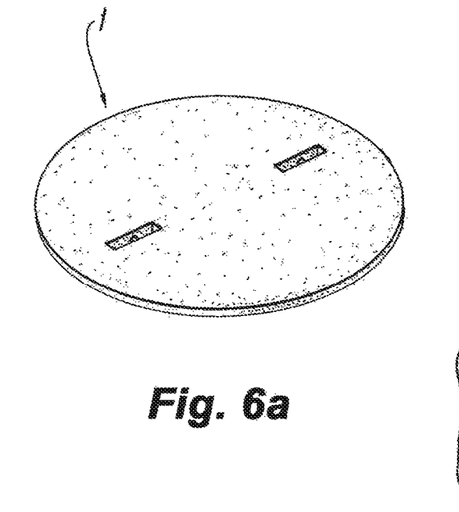
FIG. 6a is a perspective view of a cover according to an alternative embodiment of the disclosure.
Figure 6B:
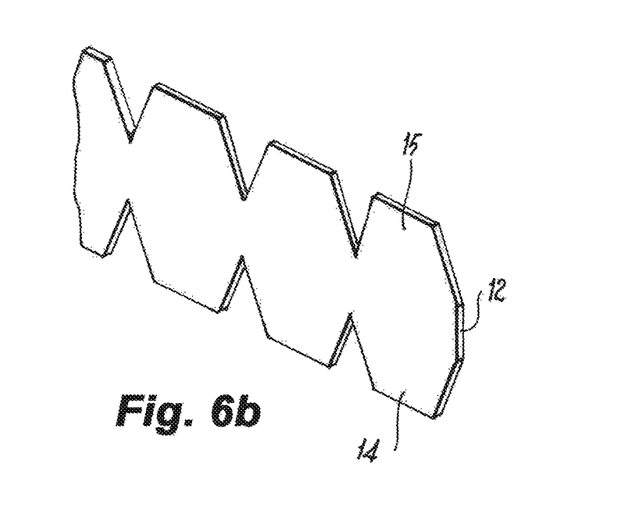

FIG. 6a shows a further embodiment of the disclosure. Cover 1 is round, making it suitable for application such as covering a manhole. Such a cover may be formed in a manner similar to the embodiments disclosed above. FIG. 6b shows an edge reinforcement 12 used to form the embodiment of FIG. 6a. In this embodiment, a single edge reinforcement extends around the circumference of the mold 10. Reinforcement 12 is notched along each edge to allow the overlapping portions 13 and 15, discussed with respect to FIGS. 2a-d and FIG. 3, to fit within a round mold cavity without bunching. According to other embodiments, by notching the edge reinforcement, covers with a variety of curvilinear shapes may be formed with a continuous edge reinforcement.

FIGS. 7a-d show a method of forming a vault cover according to a further embodiment of the disclosure. In this embodiment, rather than mixing a filler, such as glass beads, with a polymer resin and pouring the mixture into the mold, an injection molding process is used.

Figure 7A:
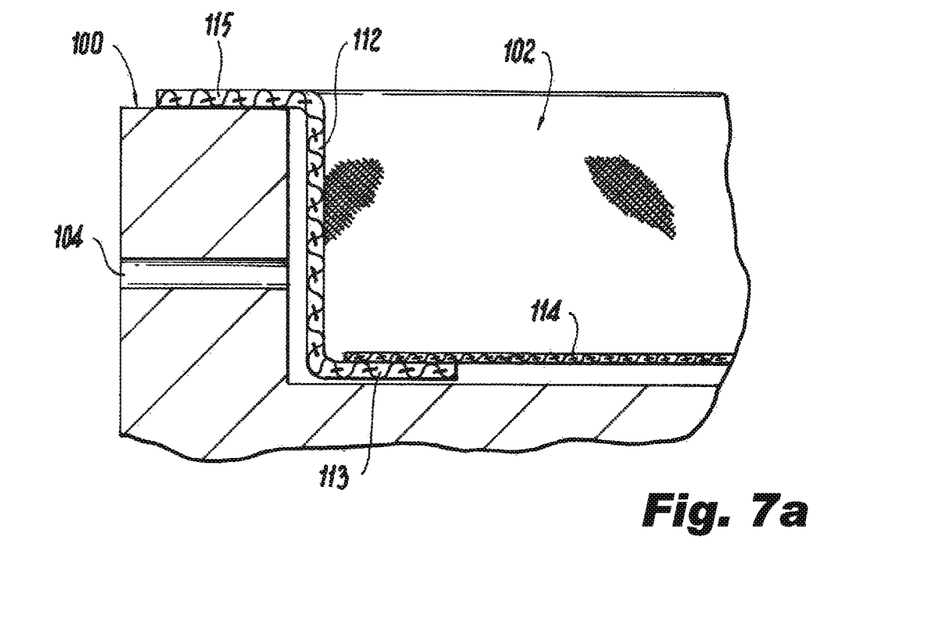
FIGS. 7a-c are cross sections of a mold cavity showing steps for forming a cover according to a further embodiment of the disclosure.

As shown in FIG. 7a, an injection mold 100 is provided with a mold cavity 102 shaped to form the vault cover. An edge reinforcement 112 is provided along the edge of the cavity 102 with a first portion 113 laid along the bottom surface of the cavity 102 and a second portion 115 laid over the edge of the mold 100. A top reinforcement 114 is placed along the bottom surface of the cavity 102 overlapping the first portion 113 of the edge reinforcement 112. The reinforcements may be formed from the same fiberglass materials are described in the previous embodiments. According to a preferred embodiment, the reinforcements are formed from a fiberglass material, such as 36 oz. pr square yard or 48 oz. per square yard quadraxial fiberglass fabric. According to one aspect of the invention, a breather layer (not shown) may be placed between the reinforcements 112 and 114 and the inside surface of the mold cavity 102. The breather layer provides additional pathways for resin and air to flow through the mold during the injection molding process, as will be described below.

Figure 7B:
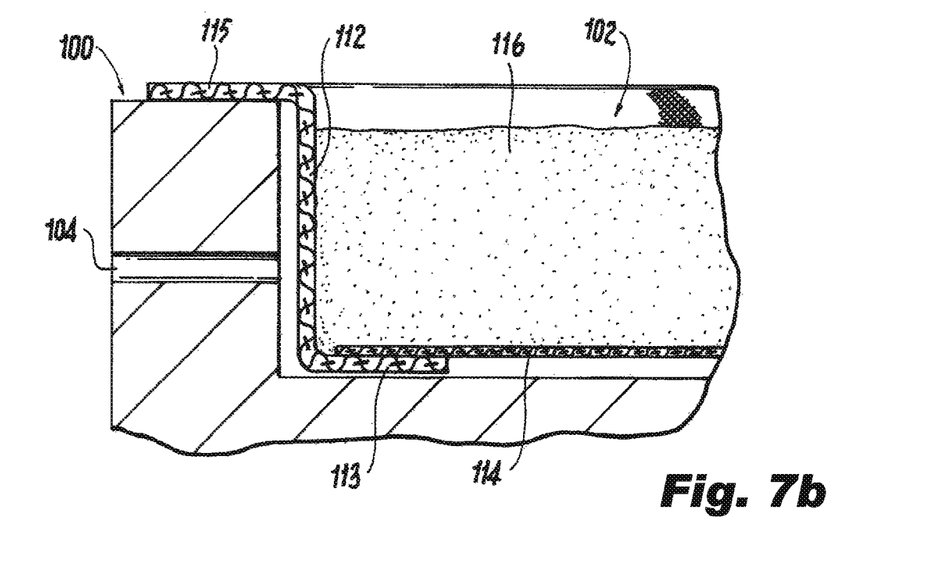

As shown in FIG. 7b, filler material 116 is placed in the mold cavity 102, filling the space inside the edge reinforcement 113 and above the top reinforcement 114. The filler material may be the same material as described in the previous embodiments. According to a preferred embodiment, the filler material 116 is expanded glass beads.

Figure 7C:
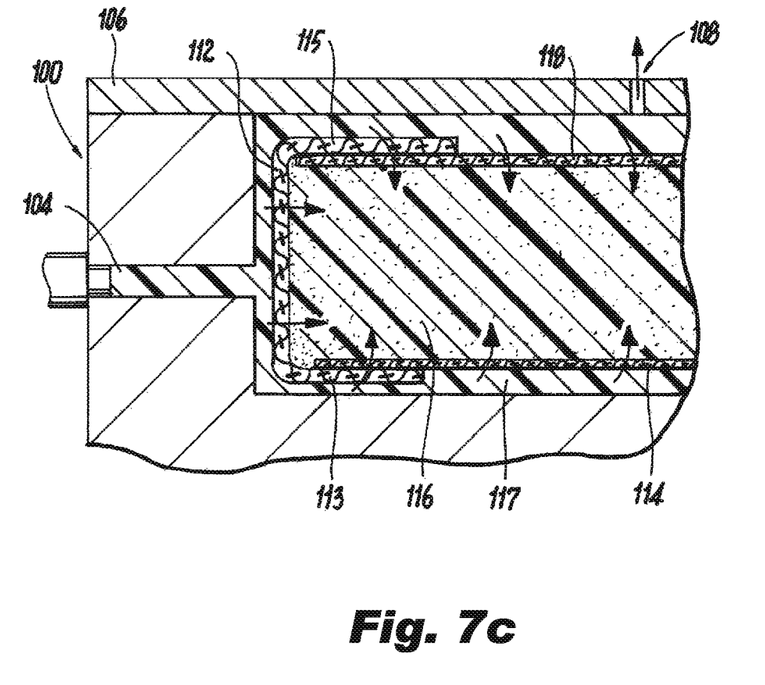

As shown in FIG. 7c, a bottom reinforcement is placed over the filler material 116. Again, the bottom reinforcement may be the same fiberglass fabric as described in previous embodiments. The second portion 115 of the edge reinforcement is folded into the mold cavity and overlaps a portion of bottom reinforcement 118. A mold cover 106 is placed over mold cavity 102 and sealed. A breather layer (not shown) may be provided between the bottom reinforcement 118 and the cover 106. Outlet port 108 on the mold cover 106 is connected with a vacuum system to provide a negative pressure to the interior of the mold. A source of injection molding resin is connected with mold inlet port 104. Resin is injected into the mold cavity via inlet port 104 while negative pressure is applied to the outlet port 108. Resin infiltrates the reinforcements, the breather layers (if used), and the filler material 116 and fills the interstitial spaces within the mold cavity. The resin is allowed to harden, thus bonding edge reinforcement 112 to the top and bottom reinforcements 114, 118 and forming a solid vault cover.

According to a further embodiment, the top, edge, and bottom reinforcements are pre-assembled, for example, by sewing or adhesively attaching portions of fabric with one another and the space inside the assembled fabric portions is filled with the filler material, e.g., expanded glass beads. The preformed assembly is then placed in the mold cavity and injection molded, as described with respect to FIG. 7c.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. A vault cover comprising:
   a bottom reinforcement layer extending, at least partially along a first horizontal plane;
   at least one "C"-shaped edge reinforcement layer, a middle portion of the edge reinforcement layer disposed proximate to an edge of the cover;
   a top reinforcement layer extending, at least partially along a second horizontal plane substantially parallel with the first horizontal plane; and
   a matrix,
   wherein a first portion of the edge reinforcement layer extends from the middle portion inward from the edge of the cover along the second horizontal plane and overlaps a portion of the top reinforcement layer, and a second portion of the edge reinforcement layer extends from the middle portion inward from the edge of the cover along the first horizontal plane and overlaps a portion of the bottom reinforcement layer, wherein the edge reinforcement layer is continuous from the first portion through the middle portion to the second portion, and wherein the overlapping portions are bonded with one another by the matrix.

2. The vault cover of claim 1, wherein one or more of the top reinforcement layer, the bottom reinforcement layer and the edge reinforcement layer are a fiberglass fabric.

3. The vault cover of claim 2 wherein the fiberglass fabric comprises a quadraxial fabric.

4. The vault cover of claim 1, wherein the matrix comprises a filler and one or more of an unsaturated polyester resin, a methacrylate, a vinyl ester, and an epoxy.

5. The vault cover of claim 4, wherein the filler comprises one or more of glass beads, expanded glass beads, limestone aggregate, silica sand, chopped fiberglass fibers, polymer fibers, metallic fibers, fly ash, expanded ceramic spheres and ceramic particles.

6. The vault cover of claim 1, adapted to cover a utility vault, a trench, or an opening in a road surface.

7. The vault cover of claim 1, further comprising one or more of a lifting pin, a fastener hole, a textured surface, and an indicia.

8. The vault cover of claim 1, further comprising one or more of a RFID device, an electronic sensor, and an induction coil embedded in the matrix.

9. A vault cover according to claim 1, wherein, when tested according to ANSI SCTE 77 Tier 22, the load at failure is greater than 30,000 pounds.

* * * * *